US007004293B2

(12) United States Patent
Schurmans

(10) Patent No.: US 7,004,293 B2
(45) Date of Patent: Feb. 28, 2006

(54) THERMAL EXPANSION COMPENSATION SHOCK ABSORBER

(75) Inventor: Rudi Schurmans, Woutervelo (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/671,354

(22) Filed: Sep. 25, 2003

(65) Prior Publication Data

US 2005/0067237 A1 Mar. 31, 2005

(51) Int. Cl.
*F16F 9/36* (2006.01)

(52) U.S. Cl. ................................. 188/322.17; 188/315

(58) Field of Classification Search ................ 188/315, 188/322.19, 276, 322.17; 92/165 R
See application file for complete search history.

(56) References Cited

U.S. PATENT DOCUMENTS

| | | | | | |
|---|---|---|---|---|---|
| 5,441,132 | A | * | 8/1995 | Pradel et al. | 188/315 |
| 5,727,662 | A | * | 3/1998 | Guy et al. | 188/315 |
| 5,738,191 | A | * | 4/1998 | Forster | 188/318 |
| 5,848,676 | A | * | 12/1998 | Deigner | 188/321.11 |
| 5,893,436 | A | * | 4/1999 | Guy | 188/322.15 |

* cited by examiner

*Primary Examiner*—Melanie Torres
(74) *Attorney, Agent, or Firm*—Harness, Dickey & Pierce, PLC

(57) ABSTRACT

The present invention provides the art with a shock absorber which is capable of compensating for the differing thermal expansion between two materials. The shock absorber in its various embodiments includes a free floating pressure tube that is able to expand or contract axially without breaking a seal, a hybrid piston rod with a shaft of one material that compensates for differing thermal expansions and a cap of another material that absorbs axial forces, a unique rod guide assembly with a biasing member that compensates for differing thermal expansions, and a unique cylinder end assembly with a biasing member made from springs, a rubber block, or pressurized gas.

23 Claims, 6 Drawing Sheets

THERMAL EXPANSION COMPENSATION SHOCK ABSORBER

FIELD OF THE INVENTION

Hydraulic dampers, such as shock absorbers, are used in connection with motor vehicle suspension systems to absorb unwanted vibrations which occur during the operation of the motor vehicle. The unwanted vibrations are dampened by shock absorbers which are generally connected between the sprung portion (i.e., the vehicle body) and the unsprung portion (i.e., the suspension) of the motor vehicle. A piston assembly is located within the compression chamber of the shock absorber and is usually connected to the body of the motor vehicle through a piston rod. The piston assembly includes a valving arrangement that is able to limit the flow of damping fluid within the compression chamber when the shock absorber is compressed or extended. As such, the shock absorber is able to generate a damping force which "smooths" or "dampens" the vibrations transmitted between the suspension and the vehicle body.

A prior art thermal expansion compensating twin tube shock absorber 100 is shown in FIG. 1. Shock absorber 100 comprises an elongated pressure tube 102 provided for defining a hydraulic fluid containing compression chamber 104 and an elongated reserve tube 106 provided for defining a hydraulic fluid containing reservoir 108.

Disposed within compression chamber 104 is a reciprocal piston assembly 110 that is secured to one end of an axially extending piston rod 112. Piston rod 112 is supported and guided for movement within pressure tube 102 by means of a combination seal and rod guide assembly 114 located at the upper end of pressure tube 102 and having a centrally extending bore 116 through which piston rod 112 is reciprocally movable. Disposed within bore 116 between rod guide assembly 114 and piston rod 112 is a bushing 118 which is used to facilitate movement of piston rod 112 with respect to rod guide assembly 114.

A compliant cylinder end assembly, generally designated at 120, is located at the lower end of pressure tube 102. The compliant cylinder end assembly 120 includes a base valve assembly 122 that functions to control the flow of hydraulic fluid between compression chamber 104 and fluid reservoir 108 as well as biasing member 124 that compensates for the differing axial thermal expansion between the various components of shock absorber 100. Fluid reservoir 108 is defined as the space between the outer peripheral surface of pressure tube 102 and the inner peripheral surface of reserve tube 106.

The upper and lower ends of shock absorber 100 are adapted for assembly into a motor vehicle. Piston rod 112 is shown having a threaded portion 126 for securing the upper end of shock absorber 100 to the motor vehicle while reserve tube 106 is shown incorporating a flange 128 having a pair of mounting holes 130 for securing the lower end of shock absorber 100 to the motor vehicle (McPherson strut configuration). While shock absorber 100 is shown in a McPherson strut configuration having threaded portion 126 and flange 128 for securing it between the sprung and unsprung portions of the motor vehicle, it is to be understood that this is merely exemplary in nature and is only intended to illustrate one type of system for securing shock absorber 100 to the motor vehicle. As will be appreciated by those skilled in the art, upon reciprocal movement of piston rod 112 and piston assembly 110, hydraulic fluid with compression chamber 104 will be transferred between an upper portion 132 and a lower portion 134 of compression chamber 104 as well as between compression chamber 104 and fluid reservoir 108 through valve assembly 122 for damping relative movement between the sprung portion and the unsprung portion of the motor vehicle.

This quick exchange of hydraulic fluid through valve assembly 122 and piston assembly 110 as well as the friction between piston assembly 110 and pressure tube 102 and the friction between piston rod 112 and rode guide 114 generates heat which is undesirable during prolonged operating conditions.

In addition to absorbing the heat generated while providing the damping function for the motor vehicle, shock absorber 100 is also required to operate over a broad range of temperatures ranging from severe cold temperatures of the winter months to the extremely hot temperatures of the summer months. Prior art shock absorbers are manufactured using steel for pressure tube 102 and reserve tube 106. While steel has been proven to be an acceptable material for these components, tubes manufactured from aluminum offer the advantages of weight savings as well as improved heat dissipation. If the typical pressure tube 102 were manufactured from steel while reservoir tube 106 were manufactured from aluminum, the difference in their relative axial thermal expansion rates may present problems for the shock absorber when operating over the necessary temperature extremes. Specifically, structural failure may occur under extreme cold temperatures or loss of pressure tube preload and sealing may occur under extreme hot temperatures.

Accordingly, continued development of shock absorbers with aluminum tubes includes the further development of methods to compensate for differing thermal expansion between aluminum and steel as well as the differing thermal expansion between any other two materials.

SUMMARY OF THE INVENTION

The present invention provides the art with a shock absorber which is capable of compensating for the differing thermal expansion between two materials and thus eliminating the possibility of structural failure due to extreme cold temperatures as well as the possibility of pressure tube preload loss and sealing failure under extreme hot temperatures.

In one embodiment of the present invention, the shock absorber includes a free floating pressure tube that is capable of compensating for differing thermal expansion by freely moving between the rod guide assembly and the valve assembly.

In another embodiment of the present invention, a unique piston rod is provided that includes an aluminum rod that eliminates the difference in thermal expansions. The rod has a steel cap that absorbs compression forces.

In another embodiment of the present invention, a unique compensating rod guide assembly is provided that includes a thermal compensation element capable of compensating for the differing thermal expansion between the pressure tube and the reserve tube.

In still another embodiment of the present invention, a unique compensating cylinder end assembly is provided that includes a thermal compensation element, and the means for securing the element to the valve assembly. This compensating element is either a spring, an elastomeric block, or gas pressure.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
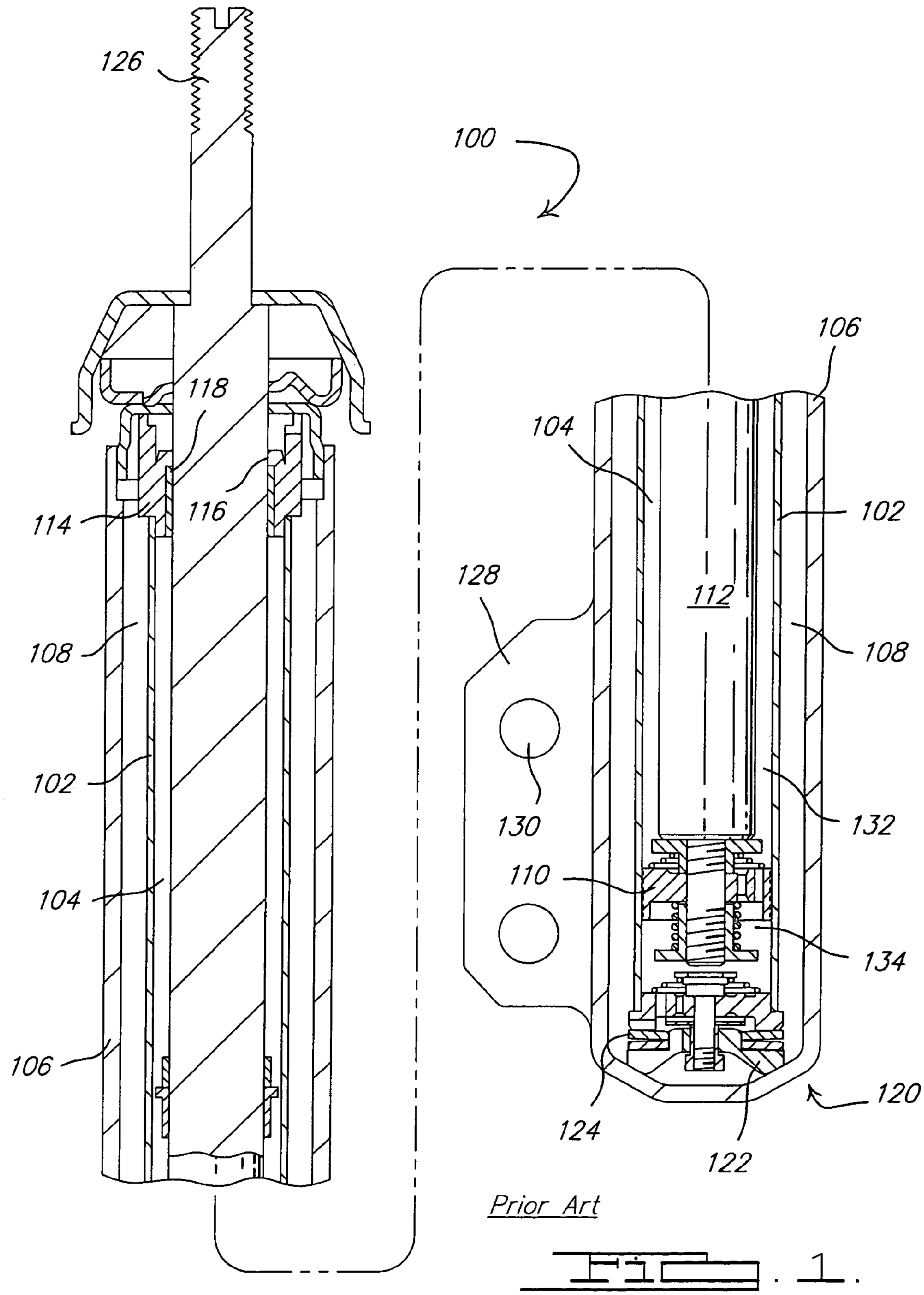
FIG. 1 is a longitudinal cross-sectional view through a prior art thermal expansion compensating shock absorber.

Continued reference is made generally to FIG. 1 and specifically to the components of shock absorber 100 throughout the subsequent description. It is to be understood that the construction of shock absorber 100 is merely exemplary in nature and is only intended to illustrate one type of hydraulic damping apparatus within which the compensating elements of the present invention can be utilized.

Figure 2:
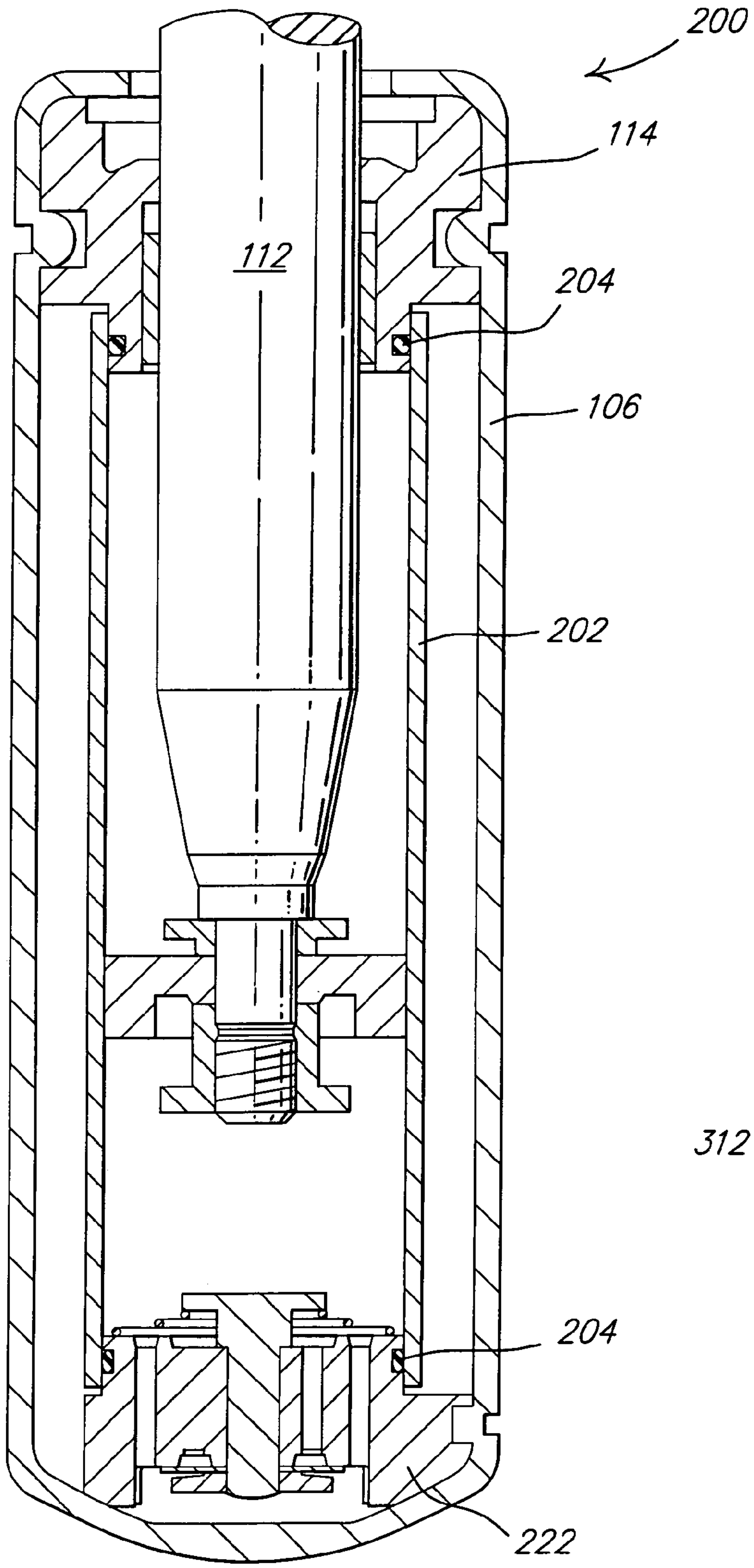
FIG. 2 is a longitudinal cross-sectional view of a shock absorber incorporating a floating pressure tube.

Referring now to the drawings in which like reference numerals designate like or corresponding parts throughout the several views, there is shown in FIG. 2 a unique compensating shock absorber 200 having a floating pressure tube 202 and a base valve assembly 222. Rod guide assembly 114 and base valve assembly 222 are mechanically secured to reserve tube 106. As the relative length of reserve tube 106 changes due to thermal conditions, the relative distance between rod guide assembly 114 and base valve assembly 222 changes. In the prior art, pressure tube 102 is fixed at one end to one portion of rod guide assembly 114 and at the other end to base valve assembly 122, such that changes in the length of pressure tube 102 due to thermal conditions were compensated for using a multi-piece valve assembly 122. In this embodiment of the present invention, a floating pressure tube 202 replaces pressure tube 102 of the prior art in order to compensate for the different thermal expansions of reserve tube 106 and floating pressure tube 202. Floating pressure tube 202 is sealed to rod guide assembly 114 and base valve assembly 222 using O-rings 204. Floating pressure tube 202 is able to move freely between rod guide assembly 114 and base valve assembly 222 as the relative length of reserve tube 106 changes. Thus, both a standard valve guide assembly and a standard base valve assembly can be easily modified to accept floating pressure tube 202.

Figure 3:
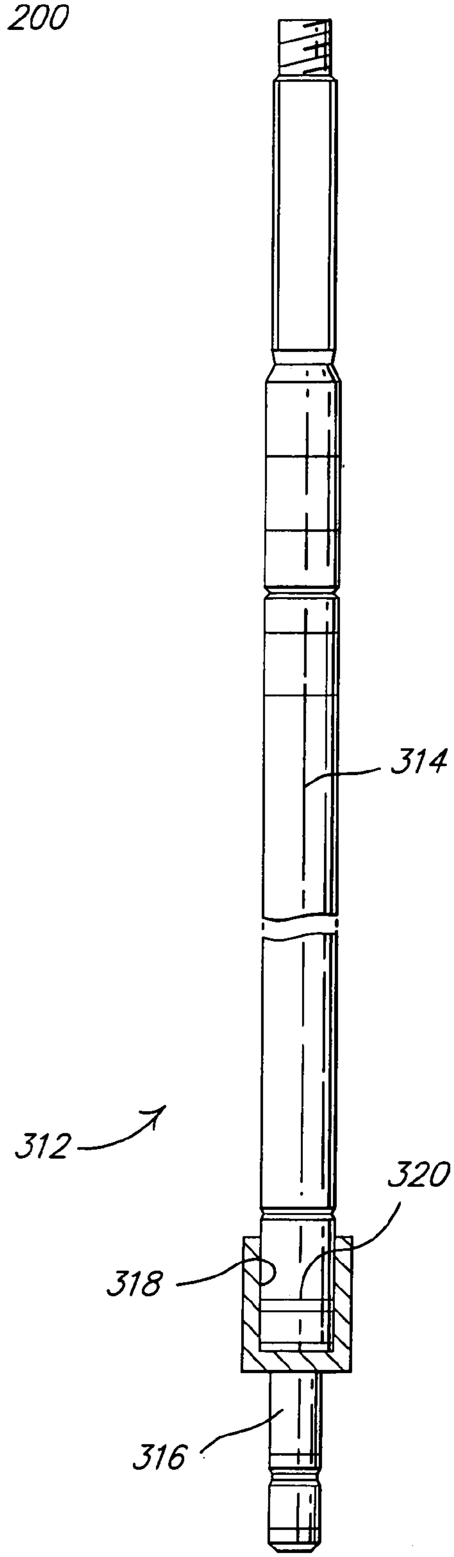
FIG. 3 is a side view of a unique aluminum piston rod with a steel cap.
Figure 4:
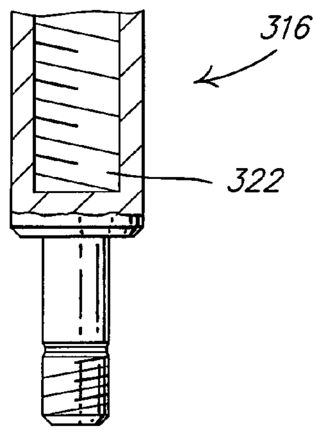
FIG. 4 is an enlarged side view of a threaded steel cap.
Figure 5:
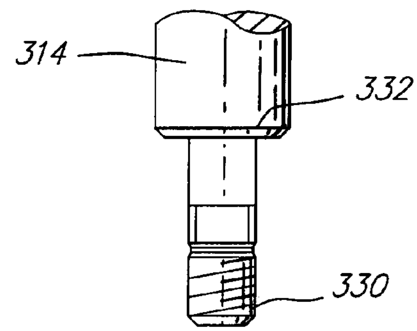
FIG. 5 is an enlarged side view of a bonded steel cap.

In another embodiment of prior art shock absorber 100, a hybrid piston rod 312 replaces the prior art piston rod 112 as shown in FIGS. 3–5. Typically the prior art piston rod 112 is made from steel while rod guide assembly 114 is made from aluminum. Under extreme thermal conditions the seal between piston rod 112 and rod guide 114 can be broken by the different thermal expansion of the two materials. Hybrid piston rod 312 includes an aluminum piston shaft 314 and a steel piston post 316. As shown in FIG. 4, piston post 316 includes an internal bore 318 which slidingly receives the end of piston shaft 314. A circle-clip 320 retains the assembly of piston post 316 and piston shaft 316. As shown in an alternative embodiment in FIG. 4, piston post 316 has an open threaded bore 322 for receiving a threaded end of piston shaft 314. Piston post 316 may be threaded on to piston shaft 314. Alternatively, as seen in FIG. 5, a modified steel piston post 330 with a flat end 332 may be adhesively secured to the end of piston shaft 314. In operation, aluminum piston shaft 314 expands and contracts at the same rate as aluminum rod guide assembly 114 and thus prevents a break in the seal between the two. Steel piston post 316, or alternately modified steel piston post 320, absorbs the axial force on piston rod 312 when shock absorber 100 is in compression.

Figure 6:
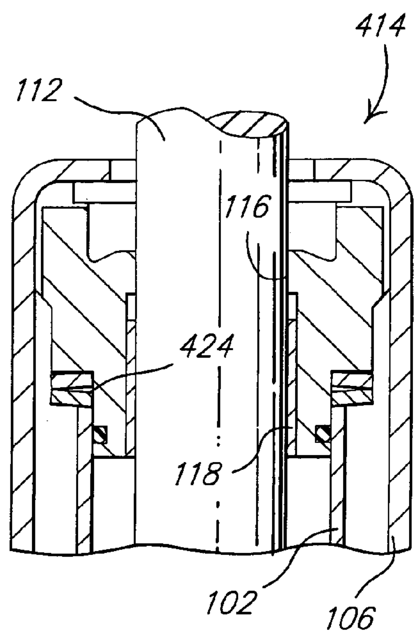
FIG. 6 is an enlarged cross-sectional view of a compensating rod guide assembly with Belleville springs.

In still another embodiment of prior art shock absorber 100, various compensating piston rod guide assemblies are shown in FIGS. 6–9. The compensating piston rod guide assembly 414, as shown in FIG. 6, supports and guides the movement of piston rod 112 and also compensates for the different thermal expansion of pressure tube 102 and reserve tube 106. Compensating piston rod guide assembly 414 includes bore 116 and bushing 118, as well as a plurality, an even number in the preferred embodiment, of Belleville springs 424 disposed between rod guide 414 and pressure tube 102. The difference in thermal expansion between steel pressure tube 102 and aluminum reserve tube 106 is compensated for by the increase or decrease in the compensation of Belleville springs 424.

Figure 7:
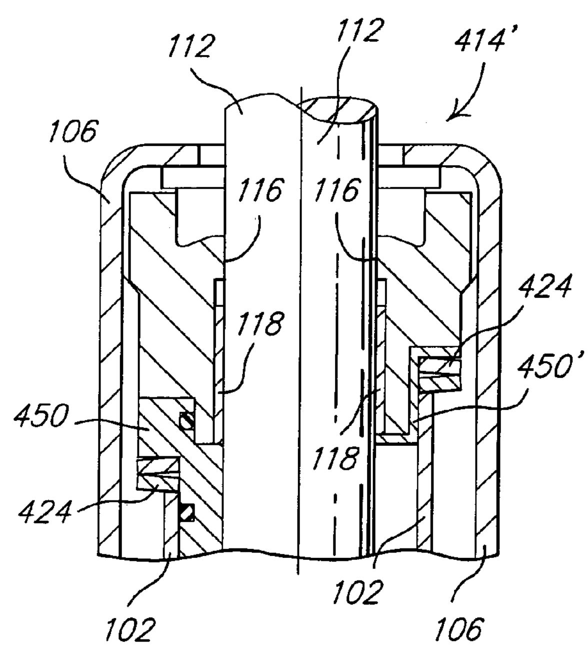
FIG. 7 is an enlarged cross-sectional view of a compensating rod guide assembly with a bearing bush retainer.

On the left side of FIG. 7, an alternate compensating piston rod guide 414' is shown. Alternate piston rod guide 414' includes a bearing bush retainer 450 disposed between Belleville springs 424 and rod guide 414'. Bearing bush retainer 450 seals rod guide 414' and pressure tube 102 and retains bushing 118, and is further designed to support Belleville springs 424. The thermal expansion of pressure tube 102 is directly compensated for by Belleville springs 424. On the right side of FIG. 7, piston rod guide 414' is shown with bearing bush retainer 450 being replaced by compensation retainer 450'. Compensation retainer 450' functions the same as bearing bush retainer 450 in that it retains bushing 118 and it is designed to support Belleville springs 424. The thermal expansion is directly compensated for by Belleville springs 424.

Figure 8:
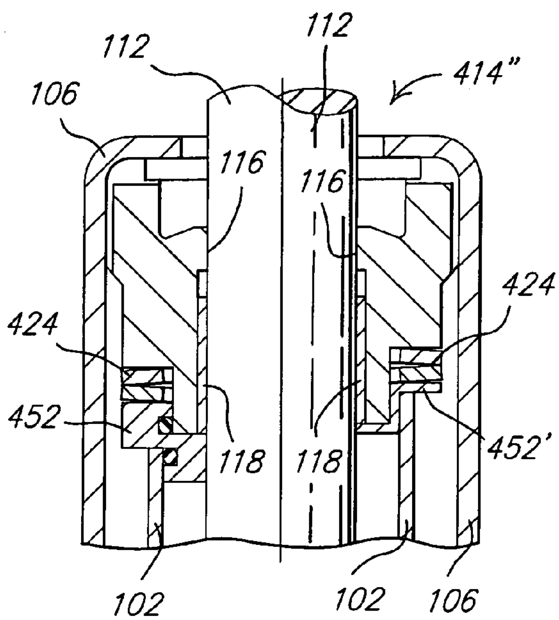
FIG. 8 is an enlarged cross-sectional view of an alternate compensating rod guide assembly with a bearing bush retainer.

In another embodiment, a compensating piston rod guide 414" is shown on the left side of FIG. 8, wherein bearing bush retainer 452 is disposed between the pressure tube 102 and Belleville springs 424. Bearing bush retainer 452 is similar to bearing bush retainer 450 in that it seals rod guide 414" and pressure tube 102 and it supports Belleville springs 424. The difference between bearing bush retainer 452 and 450 is that Belleville springs 424 are disposed between rod guide 414" and bearing bush 452 instead of between bearing bush retainer 450 and pressure tube 102 as shown in FIG. 7. The thermal expansion is directly compensated for by Belleville springs 424. On the right side of FIG. 8, piston rod guide 414" is shown with bearing bush retainer 452 being replaced by compensation retainer 452'. Compensation retainer 450' functions the same as bearing bush retainer 452' in that it retains bushing 118 and it is designed to support Belleville springs 424 with Belleville springs 424 being disposed between rod guide 414" and bush retainer 452'. The thermal expansion is directly compensated for by Belleville springs 424.

Figure 9:
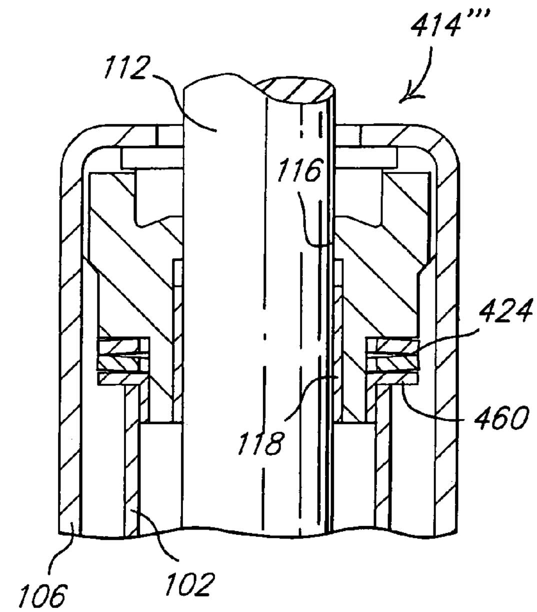
FIG. 9 is an enlarged cross-sectional view of a compensating rod guide assembly with a retainer.

In still another embodiment, a compensating piston rod guide 414'" is shown in FIG. 9, wherein bearing bush retainer 452 has been replaced by a compensation spring support 460. Spring support 460 acts to support Belleville springs 424 but it does not retain bushing 118. Belleville springs 424 are disposed between rod guide 414'" and spring support 460. The thermal expansion is directly compensated for by Belleville springs 424.

Figure 10:
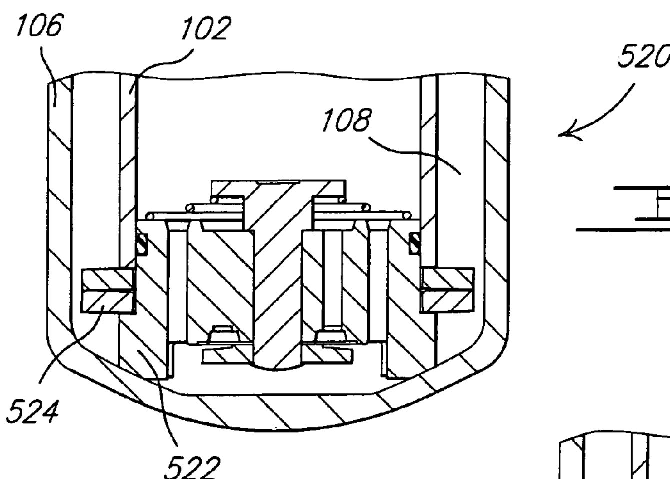
FIG. 10 is an enlarged cross-sectional view of a compensating cylinder end assembly with Belleville springs.

In yet further embodiments of prior art shock absorber 100, various compensating cylinder end assemblies are shown in FIGS. 10–19. In FIG. 10, a compensating cylinder end assembly, generally designated as 520, is located at the lower end of pressure tube 102 and functions to control the flow of hydraulic fluid between compression chamber 104 and fluid reservoir 108. Compensating end assembly 520 further acts to compensate for the differing axial thermal expansion between the various components of shock absorber 100.

In FIG. 10, compensating cylinder end assembly 520 includes a base valve assembly 522 and a plurality, an even number in the preferred embodiment, of Belleville springs 524 disposed between pressure tube 102 and base valve assembly 522. The difference in thermal expansion between the steel pressure tube 102 and the aluminum reserve tube 106 is compensated for by the increase or decrease in the compression of Belleville springs 524. This embodiment differs from the prior art shown in FIG. 1 by eliminating the need for the multi-piece base valve assembly 122 shown in FIG. 1.

Figure 11:
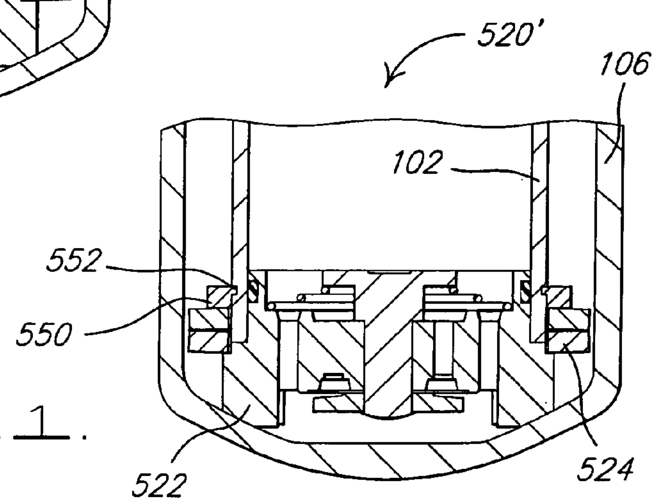
FIG. 11 is an enlarged cross-sectional view of the compensating cylinder end assembly of FIG. 10 illustrating a circle-clip and retainer support for the compensating member.

Various methods for securing Belleville springs 524 to an end assembly are shown in FIGS. 11–14. In FIG. 11, the compensating cylinder end assembly 520' includes a reaction ring 550. Reaction ring 550 is retained to the outside of pressure tube 102 by a circle-clip 552. Belleville springs 524 are disposed between ring 550 and compression valve assembly 522.

Figure 12:
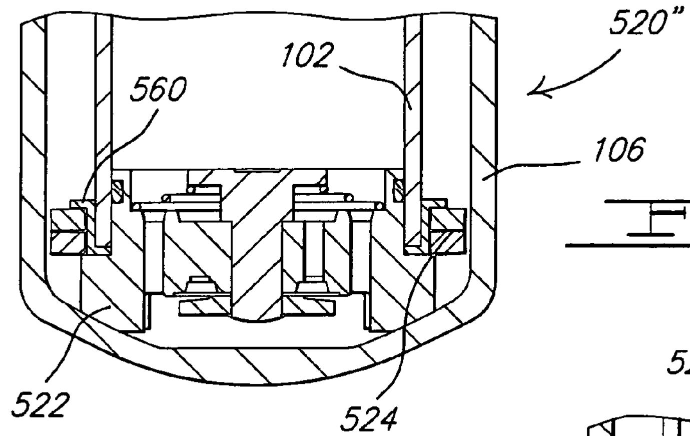
FIG. 12 is an enlarged cross-sectional view of the compensating cylinder end assembly of FIG. 10 illustrating a spring retainer for the compensating member.

In FIG. 12, a compensating cylinder end assembly 520" includes an S-shaped spring retainer 560. Spring retainer 560 is positioned between the bottom of pressure tube 102 and the top of Belleville springs 524, and acts to retain Belleville springs 524 between spring retainer 560 and valve assembly 522.

Figure 13:
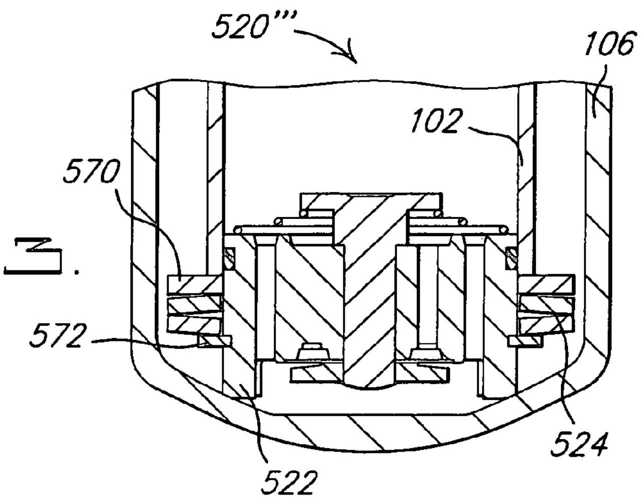
FIG. 13 is an enlarged cross-sectional view of the compensating cylinder end assembly of FIG. 10 illustrating a double ring retainer for a compensating member.

In FIG. 13, the compensating cylinder end assembly 520'" includes a first retaining ring 570 and a second retaining ring 572. First retaining ring 570 is positioned such that it is in contact with the bottom of pressure tube 102. Second retaining ring 572 is secured to valve assembly 522. Belleville springs 524 are disposed between first retaining ring 570 and second retaining ring 572.

Figure 14:
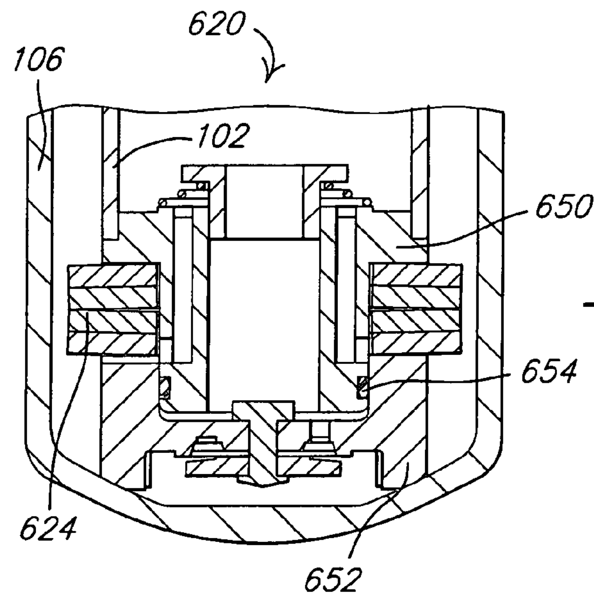
FIG. 14 is an enlarged cross-sectional view of an alternate compensating cylinder end assembly having a two piece end assembly that sandwiches the compensating member.

In FIG. 14, an alternate compensating cylinder end base valve assembly is designated at 620. Compensating end base valve assembly 620 is divided into two portions, an upper portion 650 and a lower portion 652, and includes a plurality of Belleville springs 624 disposed between the two portions 650 and 652. Upper portion 650 is connected to pressure tube 102 and lower portion 652 is connected to or abuts reserve tube 106. Upper portion 650 fits within lower portion 652 and is sealed by an O-ring 654. Belleville springs 624 are disposed between the two portions 650, 652 and act to compensate for the different thermal expansion of pressure tube 102 and reserve tube 106 by moving upper portion 650 and lower portion 652 towards or away from each other.

Figure 15:
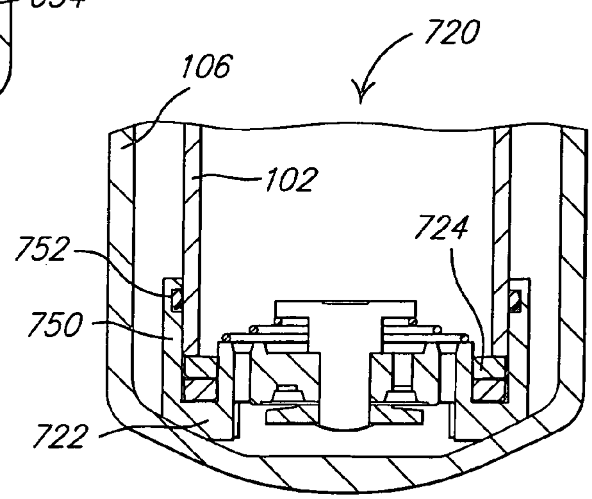
FIG. 15 is an enlarged cross-sectional view of an alternate compensating cylinder end assembly illustrating the pressure tube and compensating member disposed within the valve assembly.

In FIG. 15, an alternate compensating cylinder end assembly is designated at 720. Cylinder end assembly 720 includes a base valve assembly 722 having a cylindrical wall 750 and a plurality of Belleville springs 724. Cylindrical wall 750 is connected to and surrounds a base valve assembly 722 and further extends towards the opposite end of shock absorber 100. Pressure tube 102 slides within cylindrical wall 750, and is sealed by an O-ring 752. Belleville springs 724 are disposed between pressure tube 102 and valve assembly 722 within cylindrical wall 750.

Figure 16:
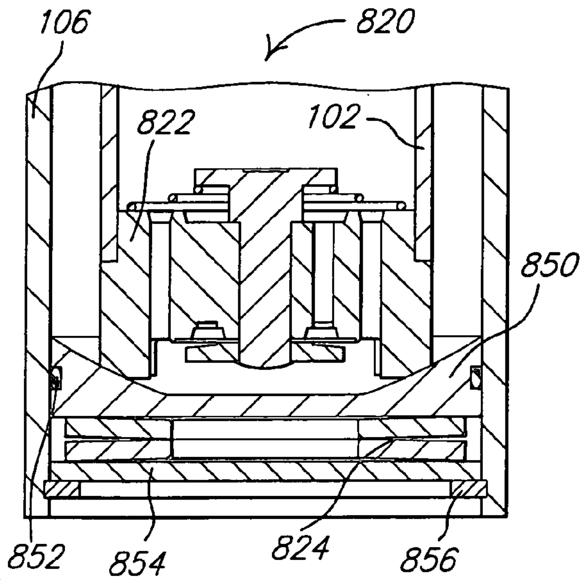
FIG. 16 is an enlarged cross-sectional view of a compensating cylinder end assembly with Belleville springs at the base.
Figure 17:
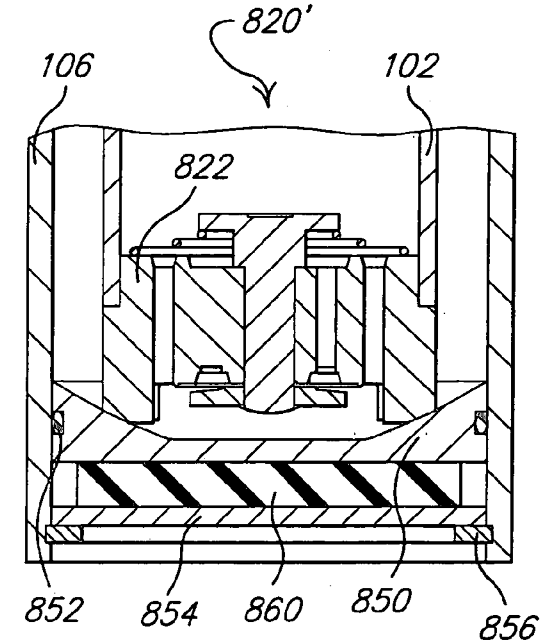
FIG. 17 is an enlarged cross-sectional view of a compensating cylinder end assembly with an elastomeric block at the base.

In another embodiment of shock absorber 100, compensating cylinder end assembly 820 is shown in FIG. 16. Compensating end assembly 820 includes a base valve assembly 822, a plurality of Belleville springs 824, a base plate 850, an O-ring 852, and a bottom retainer 854. Base plate 850 is capable of moving axially and is sealed to reserve tube 106 by O-ring 852. Bottom retainer 854 is fixed to reserve tube 106 using a retaining ring 856 and provides a flat, stable bottom for cylinder end assembly 820. Belleville springs 824, an even number in the preferred embodiment, are disposed between base plate 850 and bottom retainer 854. Belleville springs 824 act to compensate for the different thermal expansion of the various components of shock absorber 100 through base plate 850 and bottom retainer 854. In an alternate cylinder end assembly 820', as shown in FIG. 17, Belleville springs 824 are replaced with an elastomeric block 860. Elastomeric block 860 is disposed between base plate 850 and bottom retainer 854 and compensates for the different thermal expansion of pressure tube 102 and reserve tube 106 by expanding or compressing as necessary.

Figure 18:
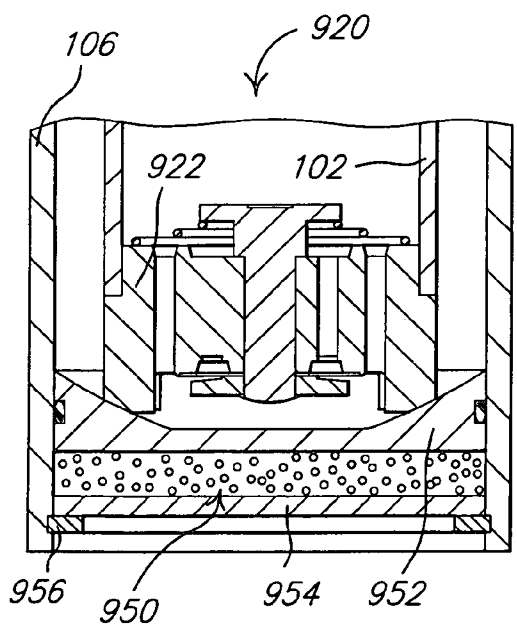
FIG. 18 is an enlarged cross-sectional view of a compensating cylinder end assembly with gas pressure at the base.
Figure 19:
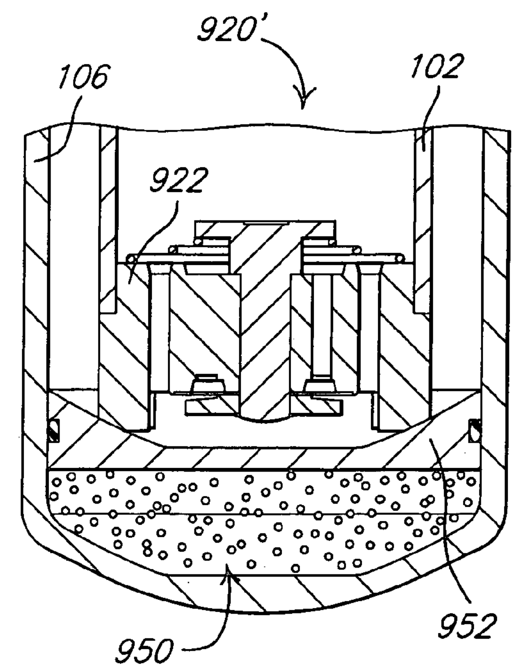
FIG. 19 is an enlarged cross-sectional view of an alternate compensating cylinder end assembly with gas pressure at the base.

In compressing cylinder end assembly 920, which includes a base valve assembly 922 as shown in FIG. 18, pressurized gas 950, for example compressed air, is disposed between a base plate 952 and a bottom retainer 954. Bottom retainer 954 is sealed to reserve tube 106 by a weld 956 or other means known in the art such that the gas 950 remains pressurized. Pressurized gas 950 compensates for the different thermal expansion of pressure tube 102 and reserve tube 106 by expanding or compressing as necessary, and also reduces the weight of the shock absorber. In alternate cylinder end assembly 920' as shown in FIG. 19, bottom retainer 954 has been removed. Pressurized gas 950 is disposed between base plate 952 and reserve tube 106 and compensates directly for the different thermal expansion of the pressure tube 102 and the reserve tube 106.

While the above detailed description describes the preferred embodiment of the present invention, it should be understood that the present invention is susceptible to modification, variation and alteration without deviating from the scope and fair meaning of the subjoined claims.

What is claimed is:

1. A shock absorber which compensates for thermal expansion, said shock absorber comprising:

a rod guide assembly;

a floating pressure tube forming a compression chamber, said pressure tube slidingly engaging said rod guide assembly;

a piston slidably disposed within said compression chamber;

a piston rod connected to said piston;

a reserve tube disposed around said pressure tube, said reserve tube and said pressure tube defining a fluid reservoir;

a cylinder end assembly disposed between said compression chamber and said fluid reservoir for controlling the flow of fluid between said compression chamber and said fluid reservoir, said pressure tube slidingly engaging said cylinder end assembly; and a first biasing member disposed between said pressure tube and said rod guide assembly for urging said pressure tube axially away from said rod guide assembly;

said floating pressure tube being able to move freely relative to said rod guide assembly and said cylinder end assembly.

2. The shock absorber according to claim 1, wherein said piston rod comprises:

a two-piece piston rod connected to said piston, said two-piece piston rod including a shaft and a piston post, said piston post being secured to said piston.

3. The shock absorber according to claim 2, wherein said shaft is made from a first material and said piston post is made from a second material.

4. The shock absorber according to claim 3, wherein said piston post is threaded such that it screws onto said shaft.

5. The shock absorber according to claim 3, wherein said piston post is bonded to said shaft.

6. The shock absorber according to claim 3, wherein said piston post is secured to said shaft by a circle-clip.

7. The shock absorber according to claim 1, wherein said first biasing member is at least one Belleville spring.

8. The shock absorber according to claim 1, wherein a retainer is disposed between said rod guide assembly and said first biasing member.

9. The shock absorber according to claim 1, wherein a retainer for supporting said first biasing member is disposed between said first biasing member and said pressure tube.

10. The shock absorber according to claim 1, wherein said rod guide assembly further includes a bushing for facilitating movement of said piston rod.

11. The shock absorber according to claim 10, wherein a retainer retains said bushing.

12. The shock absorber according to claim 1 further comprising:

a second biasing member disposed between said pressure tube and said cylinder end assembly for urging said pressure tube away from said cylinder end assembly.

13. The shock absorber according to claim 12, wherein said second biasing member is a Belleville spring.

14. The shock absorber according to claim 13, wherein said Belleville spring is secured to said cylinder end assembly by a circle-clip.

15. The shock absorber according to claim 13, wherein said Belleville spring is secured to said cylinder end assembly by a spring retainer.

16. The shock absorber according to claim 13, wherein said Belleville spring is disposed between two radial retainers secured to the cylinder end assembly.

17. The shock absorber according to claim 12, wherein said cylinder end assembly has two portions, a top portion connected to said pressure tube and a bottom portion connected to said reserve tube, said top portion slidingly engaging said bottom portion.

18. The shock absorber according to claim 17, wherein said second biasing member is disposed between said top portion and said bottom portion.

19. The shock absorber according to claim 12, wherein said second biasing member and one end of said pressure tube are disposed within said cylinder end assembly.

20. The shock absorber according to claim 1 further comprising:

a base plate slidingly engaging said reserve tube adjacent said cylinder end assembly; and a second biasing member disposed between said base plate and an end of said reserve tube for urging said base plate away from said end of said reserve tube.

21. The shock absorber according to claim 20, wherein said second biasing member is a Belleville spring.

22. The shock absorber according to claim 20, wherein said second biasing member is an elastomeric block.

23. The shock absorber according to claim 22, wherein said second biasing member is a pressurized gas.

* * * * *

UNITED STATES PATENT AND TRADEMARK OFFICE

CERTIFICATE OF CORRECTION

PATENT NO. : 7,004,293 B2
APPLICATION NO. : 10/671354
DATED : February 28, 2006
INVENTOR(S) : Rudi Schurmans It is certified that error appears in the above-identified patent and that said Letters Patent is hereby corrected as shown below:

Col. 2, line 8, "rode" should be --rod--

Col. 4, line 35, "piston shaft 316" should be --piston shaft 314--

Col. 8, line 49, claim 23, "claim 22" should be --claim 20--

Signed and Sealed this

First Day of August, 2006

JON W. DUDAS

*Director of the United States Patent and Trademark Office*